United States Patent [19]

Hooykaas

[11] Patent Number: 5,067,981

[45] Date of Patent: Nov. 26, 1991

[54] METHOD FOR RENDERING TOXIC WASTE HARMLESS

[75] Inventor: Carel W. J. Hooykaas, Rotterdam, Netherlands

[73] Assignee: Pelt & Hooykaas B.V., Rotterdam, Netherlands

[21] Appl. No.: 413,335

[22] Filed: Sep. 27, 1989

[30] Foreign Application Priority Data

Sep. 29, 1988 [NL] Netherlands .......................... 8802398

[51] Int. Cl.$^5$ .............................................. C04B 7/14
[52] U.S. Cl. ..................................................... 106/790
[58] Field of Search ................................ 106/117, 790

[56] References Cited

U.S. PATENT DOCUMENTS

| | | | |
|---|---|---|---|
| 4,015,997 | 4/1977 | Selmeczi et al. | 106/287 |
| 4,404,105 | 9/1985 | de Lockerente et al. | 210/710 |
| 4,504,321 | 3/1985 | Kapland et al. | 106/117 |
| 4,741,776 | 5/1988 | Bye et al. | 106/89 |

FOREIGN PATENT DOCUMENTS

| | | |
|---|---|---|
| 3411009 | 9/1985 | Fed. Rep. of Germany . |
| 2451901 | 10/1980 | France . |
| 53-58530 | 5/1978 | Japan ................... 106/117 |
| 55-167077 | 6/1979 | Japan ................... 106/117 |
| 7608760 | 2/1977 | Netherlands . |
| 51660 | 5/1978 | U.S.S.R. ............... 106/117 |
| 2182323 | 5/1987 | United Kingdom . |
| 2187727 | 9/1987 | United Kingdom . |

*Primary Examiner*—William R. Dixon, Jr.
*Assistant Examiner*—Alan Wright
*Attorney, Agent, or Firm*—Fiddler & Levine

[57] ABSTRACT

A method for rendering toxic waste harmless by mixing water, at least ground, granulated blast furnace slag as reagent and said waste to form a transportable fluid slurry which can be allowed to harden to a hard, rock-like material. The toxic waste appropriately consists of substances which do not react with the reagent. A hardening activator can be added to the slurry at an arbitrary point in time. The solids content of the slurry, based on water-insoluble substances, is preferably at least 50%.

11 Claims, No Drawings

METHOD FOR RENDERING TOXIC WASTE HARMLESS

BACKGROUND OF THE INVENTION

The invention relates to a method for rendering toxic waste harmless by: mixing water, at least one pulverulent inorganic reagent based on calcium compounds and said waste to form a transportable fluid slurry which can be allowed to harden to a hard, rock-like material.

DISCLOSURE OF THE PRIOR ART

A method of this type is already known per se. However, the consequence of the reagent used in this case is that, when the slurry is formed, the hardening thereof to give a hard, rock-like material takes place fairly rapidly. This known slurry can thus also not be transported over large distances. Moreover, it has been found that with the known material containing toxic waste, leaching out of toxic materials from the hardened material can take place.

SUMMARY OF THE INVENTION

A method has now been found which does not have these drawbacks, by virtue of the choice of a specific reagent.

The invention therefore relates to a method of the type mentioned in the preamble, which method is characterized in that ground, granulated blast furnace slag is used as the reagent.

A slurry formed in this way remains fluid, and therefore transportable, for a long time.

It is pointed out that toxic waste is essentially understood to mean inorganic waste which is harmful for the environment and therefore cannot be discarded as such. The toxic waste to be used appropriately consists of substances which do not react with the reagent employed.

Preferably, a hardening activator is also added to the slurry at an arbitrary point in time.

The addition of a hardening activator has the advantage that hardening can be accelerated and a hardened material is obtained which has a sufficiently high compressive strength and low permeability after a relatively short time, as a result of which the risk of the toxic material leaching out is greatly reduced.

Surprisingly, it has also been found that the use of ground, granulated blast furnace slag leads to a better skeleton of the final, hard material, in which the toxic waste added is retained well.

Advantageously, a slurry is formed which has a solids content, based on water-insoluble substances, of at least 50%. Preferably, however, a slurry is formed which has a solids content, based on water-insoluble substances, of 55–70%. Even solids contents of this level are found not to constitute a problem for the hardening of the slurry.

Preferably, the hardening activator is chosen from sulphate- and/or chloride-containing material, Portland cement, fly ash or a combination of these substances.

Advantageously, calcium sulphate is used as sulphate-containing material and sodium chloride as chloride-containing material. Such materials are inexpensive and widely available.

The hardening-promoting action of sulphate can be seen from the data given in the following table:

| Mixture No. | Ground, granulated blast furnace slag (%) | SO$_4$ % | Actual solids content | Strength after 7 days (psi) | Strength after 28 days (psi) |
|---|---|---|---|---|---|
| 1 | 10 | 0 | 6.1 | no hardening | no hardening |
| 2 | 10 | 1 | 62.7 | no hardening | 277.7± 1.9 |
| 3 | 10 | 4 | 67.6 | 73.8± 1.7 | 647.4± 9.1 |

It is pointed out that in regions where sea water is available this will, of course, be the hardening activator preferably used.

If Portland cement is used as hardening activator, this is added in an amount of at most 10%, more particularly 1–4% and preferably 2% relative to the weight of the slurry.

An advantageous embodiment of the method of the invention consists in wholly or partially replacing Portland cement by fly ash. Such a replacement is particularly important in the case of an unfavourable ratio between the amount of water present and the amount of solids which is supplied for rendering toxic waste harmless. The fly ash added as hardening activator also serves as a filler for increasing the solids content.

Preferably, fly ash is used in an amount of 1–10%, preferably 1–4% and more particularly approximately 2%, relative to the weight of slurry.

The compressive strength of a hard, rock-like material obtained according to the method of the invention is more than 100 psi after 28 days.

Toxic waste which can be rendered harmless in accordance with the method of invention is understood to mean any type of toxic waste which is usually formed in diverse industrial processes.

More particularly, the toxic waste may contain elements such as aluminium, boron, cadmium, chromium, copper, iron, lead, manganese, nickel, tin, zinc, antimony, barium, cobalt, mercury, selenium or silver or a compound of one of these elements.

In addition the waste may contain one or more salts, such as fluoride, sulphate, phosphate, sulphite, cyanide, sulphide, thiocyanate, thiosulphate, ferricyanide or ferrocyanide.

Finally, it is possible for arsenic, gallium, hafnium, molybdenum, niobium, strontium, tantalum, thorium, titanium, vanadium or zirconium, or a compound of one of these elements, to be present in the toxic waste added.

DESCRIPTION OF THE PREFERRED EMBODIMENTS

Example I

An aqueous slurry is prepared by mixing 60 kg of solids which contain contaminants originating from electrolytic coating, in particular zinc, lead, cadmium, manganese, copper and nickel, with 30 kg of a mixture of 10% by weight of ground, granulated blast furnace slag, 2% by weight of fly ash, 2% by weight of Portland cement and water as the remaining constituent.

The slurry formed in this way initially has a rate of hardening which is so low that the slurry still remains sufficiently fluid for 3 days.

After 7 days hardening the rock-like material has a compressive strength of 400 psi and after 28 days hardening a compressive strength of 950 psi. The permeability was $1 \times 10^{-7}$ cm.sec$^{-1}$ after hardening for 28 days.

It is pointed out that the compressive strength was measured in accordance with the method described in British Standard 1610, while the permeability was measured in accordance with the method which was developed by E. Madgwick and is described in Phil. Mag. S. 7, vol. 13, no. 85, 1932, page 632.

Example II

An aqueous slurry is prepared by mixing 60 kg of solids which contain contaminants with 3 kg of ground, granulated blast furnace slag and approximately 26 kg of water.

This slurry can be stored for a prolonged period.

After adding the other constituents, as given in Example I, hardening occurs to give a hardened material having the characteristics indicated in Example I.

I claim:

1. In a method for treating toxic waste in which the waste is mixed with water and a pulverent inorganic reagent based on calcium compounds to form a transportable fluid slurry which may be hardened, the improvement comprising the steps of: employing ground granulated blast furnace slag as the reagent; and adding a hardening activator to the slurry to accelerate hardening without the inclusion of any additional acid or basic means to obtain a material having a strength of more than 50 psi.

2. Method according to claim 1, wherein the toxic waste consists of substances which do not react with the reagent employed.

3. Method according to claim 1, wherein the slurry formed has a solids content, based on water-insoluble substances, of 55-70%.

4. Method according to claim 1, wherein the hardening activator is chosen from sulphate-containing, chloride-containing material, Portland cement, fly ash or a combination of two or more of these substances.

5. Method according to claim 4 wherein calcium sulphate is used as sulphate-containing material and sodium chloride is used as chloride-containing material.

6. Method according to claim 4 wherein Portland cement is used in an amount of at most 10%, relative to the weight of the slurry.

7. Method according to claim 4, wherein fly ash is used in an amount of 1-10%, relative to the weight of the slurry.

8. Method according to claim 1, wherein the material obtained has a strength of more than 100 psi after hardening for 28 days.

9. Method according to claim 1, wherein the waste contains aluminium, boron, cadmium, chromium, copper, iron, lead, manganese, nickel, tin, zinc, antimony, barium, cobalt, mercury, selenium or silver, or a compound including any of these elements.

10. Method according to claim 1, wherein the waste contains fluoride, sulphate, phosphate, sulphite, cyanide, sulphide, thiocyanate, thiosulphate, ferricyanide or ferrocyanide.

11. Method according to claim 1, wherein the waste contains arsenic, gallium, hafnium, molybdenum, niobium, strontium, tantalum, thorium, titanium, vanadium or zirconium, or a compound including any of these elements.

* * * * *

UNITED STATES PATENT AND TRADEMARK OFFICE
CERTIFICATE OF CORRECTION

PATENT NO. : 5,067,981
DATED : November 26, 1991
INVENTOR(S) : Carel W.J. Hooykaas It is certified that error appears in the above-identified patent and that said Letters Patent is hereby corrected as shown below:

Col. 3;   In claim 1, line 4, after "slurry" ,

--- having a solids content of at least 50% --- should appear.

Signed and Sealed this

Second Day of March, 1993

Attest:

STEPHEN G. KUNIN

*Attesting Officer*   Acting Commissioner of Patents and Trademarks